UNITED STATES PATENT OFFICE.

JOSÉ BAXERES DE ALZUGARAY, OF NEW YORK, N. Y., ASSIGNOR TO INTERNATIONAL METALLURGICAL COMPANY, OF NEW YORK, N. Y., A CORPORATION OF DELAWARE.

LEACHING SOLUTION FOR EXTRACTING METALS FROM ORES.

1,018,955. Specification of Letters Patent. Patented Feb. 27, 1912.

No Drawing. Application filed September 21, 1907, Serial No. 393,976. Renewed January 26, 1912. Serial No. 673,958.

*To all whom it may concern:*

Be it known that I, JOSÉ BAXERES DE ALZUGARAY, a citizen of Argentina, residing in New York, county of New York, and State of New York, have invented a new and useful Improvement in Leaching Solutions for Extracting Metals from Ores, of which the following is a description.

This invention relates to the art of extracting metals from ores, and especially to leaching solutions by which gold and silver are extracted from their ores.

The object of my invention is to provide a solution by which to obtain gold and silver values from ores quickly and more easily than heretofore possible, and obtain high values in a comparatively short time and at a greatly reduced cost.

In the use of my solution or leach, gold and silver are extracted from their ores by means of solutions of alkali metal and alkali-earth metal cyanids and of the double cyanids formed by the combination of the ferro and ferricyanic proportions.

In extracting gold and silver from their ores by means of solutions of cyanogen salts, the oxidation of both metals, required to effect their solution, by cyanid is often slow and incomplete, owing to the presence of base metals and of several of the non-metallic elements with which the precious metals are often mixed or are in a state of combination, and which have the effect of partially decomposing the cyanid solutions, rendering their action slow and uncertain. Instead of depending solely upon the slow agency of air for the oxidizing of the precious metals, as has been common, this action of the cyanogen solvents is rendered much more energetic by combining it with the action of bromin oxy-acids, and especially of the hypobromous acid and the perbromic acid and of the corresponding alkali metal and alkali-earth metal hypobromites, bromates and perbromites. The action of these compounds on the non-metallic elements is almost instantaneous. They rapidly oxidize the sulfids, tellurids, selenids, arsenids and antimonids, forming corresponding acids and rendering free the precious metals (gold and silver), while the decomposition of the hypobromites, bromates and perbromites, which takes place at the same time, liberates the alkali metal, or alkali-earth metal forming the bromin acid salt, and which serves the dual purpose of oxidizing the refractory compounds forming, or usually in combination with, the metals, and rendering the metallic values free and easily soluble in the cyanogen solution, and also neutralizing the acidity produced by these interactions.

An independent cause of slowness in the extraction of gold values from the ores consists in the irregular action of the cyanid solvents on silver. This difficulty is easily avoided by adding to the leaching solution, formed by cyanogen and oxy-acid bromin salts, a suitable amount of an alkali metal or of an alkali-earth metal chlorid, which acts especially as a silver solvent, the silver chlorid formed being easily soluble in cyanid solutions.

As an example of a leaching solution which I have found suitable and effective according to my invention, the following may be noted: The leaching solution I generally use is formed—

| | |
|---|---|
| Cyanid of potassium | 0.6 |
| Ferrocyanid | 0.3 |
| Hypobromite, bromate or perbromite of lime | 0.1 |
| Sodium or calcium chlorid | 3.0 |

In the practice of my invention, the same, or substantially the same, apparatus may be used and general treatment may be observed as are usual in connection with common cyanid methods.

Having thus set forth my invention, what I claim and desire to secure by Letters Patent is:

1. The leaching solution for gold and silver sulfids comprising cyanid of potassium, ferrocyanid, calcium bromate, and sodium chlorid.

2. The leaching solution for gold and silver comprising cyanid of potassium, ferrocyanid, a bromin compound and sodium chlorid.

In testimony whereof I have hereunto signed my name in the presence of two subscribing witnesses.

JOSÉ BAXERES DE ALZUGARAY.

Witnesses:
 FLORENCE ATEN IVES,
 CHAS. McC. CHAPMAN.

Copies of this patent may be obtained for five cents each, by addressing the "Commissioner of Patents, Washington, D. C."